United States Patent
Lin et al.

(10) Patent No.: US 8,543,846 B2
(45) Date of Patent: Sep. 24, 2013

(54) TEMPERATURE CONTROL METHOD AND ELECTRONIC DEVICE THEREOF

(75) Inventors: Rung-Lung Lin, Hsichih (TW);
Chuan-Wei Lee, Hsichih (TW);
Shih-Jie Chang, Hsichih (TW)

(73) Assignee: Acer Incorporated, Hsichih, Taipei County (TW)

( * ) Notice: Subject to any disclaimer, the term of this patent is extended or adjusted under 35 U.S.C. 154(b) by 400 days.

(21) Appl. No.: 12/768,075

(22) Filed: Apr. 27, 2010

(65) Prior Publication Data
US 2011/0161685 A1 Jun. 30, 2011

(30) Foreign Application Priority Data
Dec. 31, 2009 (TW) .............................. 98146340 A

(51) Int. Cl.
*G06F 1/26* (2006.01)
*G06F 1/32* (2006.01)

(52) U.S. Cl.
USPC ........................... 713/300; 713/320; 713/322

(58) Field of Classification Search
USPC ......................................... 713/300, 320, 322
See application file for complete search history.

(56) References Cited

U.S. PATENT DOCUMENTS

| | | | |
|---|---|---|---|
| 2004/0193929 A1* | 9/2004 | Kuranuki | 713/322 |
| 2007/0067136 A1* | 3/2007 | Conroy et al. | 702/130 |
| 2008/0022140 A1* | 1/2008 | Yamada et al. | 713/322 |

FOREIGN PATENT DOCUMENTS

TW    I246932 B    12/2005

OTHER PUBLICATIONS

Taiwan Search Report dated Jan. 25, 2013.

* cited by examiner

*Primary Examiner* — Vincent Tran
(74) *Attorney, Agent, or Firm* — Harness, Dickey & Pierce, PLC

(57) ABSTRACT

A temperature control method and an electronic device thereof are disclosed. A temperature control method applicable to an electronic device comprises the following steps. A power-consumption vs. temperature lookup table is provided, which records a plurality of thermal zones and a plurality of power consumption budgets corresponding thereto. An initial power consumption budget is obtained from the power-consumption vs. temperature lookup table based on an initial thermal zone value. The power consumption modes of the plural processing units are dynamically regulated according to each detected duty basis of the processing units, and the initial power consumption budget. The power consumption budget is dynamically changed according to a detected temperature of the electronic device and the power-consumption vs. temperature lookup table.

8 Claims, 4 Drawing Sheets

TEMPERATURE CONTROL METHOD AND ELECTRONIC DEVICE THEREOF

FIELD OF THE INVENTION

The present invention relates to a temperature control method and an electronic device thereof, and more particularly to a method and an electronic device for dynamically regulating the power consumption mode of plural electronic elements of an electronic device.

BACKGROUND OF THE INVENTION

According to the existing temperature control mechanism for a computer device, a heat dissipation level, such as the rotary speed of a cooling fan of the computer device, is generally decided according to a sum of the maximum possible power of all electronic elements of the computer device. However, with this temperature control mechanism, the computer device tends to keep at a relatively lower performance level to avoid system overheat, or use a large-size fan to maintain the computer device at a required performance level. In recent years, as a result of user demands and upgraded semiconductor process technologies, the notebook computer has been designed to have a compact configuration with light weight and low profile, which also causes the problem of failing to mount a large-size heat dissipation device in the notebook computer. Therefore, the low-profile and light-weight notebook computer has to sacrifice the computing performance to avoid overheat. In addition, since users pay more and more attention to the image visual effect, the graphics processing unit (GPU) chip has already become another high power consumption and heat producing element other than the central processing unit (CPU) chip in the computer device. In most of the use conditions, the CPU and the GPU rarely operate at high speed at the same time. Thus, the computer device requires a more effective way for regulating the power consumption of the CPU and GPU. In view of this, it is actually an urgent issue of how to take both the temperature and the good operating performance of a computer device into consideration at the same time.

SUMMARY OF THE INVENTION

A primary object of the present invention is to provide a temperature control method and an electronic device thereof, so that both the temperature and the best possible performance of an electronic device, such as a notebook computer, are taken into consideration at the same time.

Another object of the present invention is to provide a temperature control method and an electronic device thereof, so as to increase the possibility of having a compact, lightweight and low-profile notebook computer.

To achieve the above objects, an aspect of the present invention provides a temperature control method applicable to an electronic device that includes a first processing unit, a second processing unit, a heat dissipation unit and a temperature detection unit. The first processing unit and the second processing unit respectively have a plurality of power consumption modes. The temperature control method includes the steps of providing a power-consumption vs. temperature lookup table that records a plurality of thermal zones and a plurality of power consumption budgets corresponding thereto; setting an initial thermal zone value and checking the power-consumption vs. temperature lookup table to obtain an initial power consumption budget based on the initial thermal zone value; detecting a duty basis of the first or the second processing unit; dynamically regulating a power consumption mode of the first or the second processing unit according to the detected duty basis and the initial power consumption budget; detecting a temperature of the electronic device; and dynamically changing the power consumption budget according to the detected temperature of the electronic device and the power-consumption vs. temperature lookup table.

In an embodiment of the present invention, the first processing unit is a central processing unit (CPU) chip.

In an embodiment of the present invention, the second processing unit is a graphics processing unit (GPU) chip.

In the present invention, the step of detecting the duty basis further includes the step of detecting the number, types, or electric current consumption of applications executed by the first or the second processing unit.

The temperature control method of the present invention further includes the steps of determining whether a total power consumption of the electronic device exceeds the initial power consumption budget; and re-regulating the power consumption mode of the first or the second processing unit while the electronic device has a total power consumption exceeded the initial power consumption budget.

The temperature control method of the present invention further includes the steps of detecting a temperature of the electronic device after the power consumption mode of the first or the second processing unit has been regulated; and dynamically re-regulating the power consumption mode of the first or the second processing unit again according to the detected temperature of the electronic device.

To achieve the above objects, another aspect of the present invention provides an electronic device that includes a first processing unit, a second processing unit, a heat dissipation unit, a temperature detection unit, a storage unit, and a temperature control unit. The first and the second processing unit respectively have a plurality of power consumption modes. The temperature detection unit detects a temperature of the electronic device; and the heat dissipation unit dissipates heat produced by the electronic device. The storage unit stores a power-consumption vs. temperature lookup table therein, which records a plurality of thermal zones and a plurality of power consumption budgets corresponding thereto. The temperature control unit checks the power-consumption vs. temperature lookup table to obtain an initial power consumption budget based on an initial thermal zone value, and detects a duty basis of the first or the second processing unit. Further, the temperature control unit dynamically regulates the power consumption mode of the first or the second processing unit according to the duty basis and the initial power consumption budget, and dynamically changes the power consumption budget according to the temperature and the power-consumption vs. temperature lookup table.

In an embodiment of the present invention, the first processing unit is a central processing unit (CPU) chip.

In an embodiment of the present invention, the second processing unit is a graphics processing unit (GPU) chip.

In the present invention, the duty basis of the first or the second processing unit includes the number, types, or electric current consumption of applications executed by the first or the second processing unit.

In the present invention, the temperature control unit further determines whether a total power consumption of the electric device exceeds the initial power consumption budget; and re-regulates the power consumption mode of the first or the second processing unit while the total power consumption is exceeded the initial power consumption budget.

In the present invention, the temperature control unit detects a temperature of the electronic devices after the power consumption mode of the first or the second processing unit are regulated. Further, the temperature control unit dynamically re-regulates the power consumption mode of the first or the second processing unit according to the detected temperature of the electronic device.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 1:
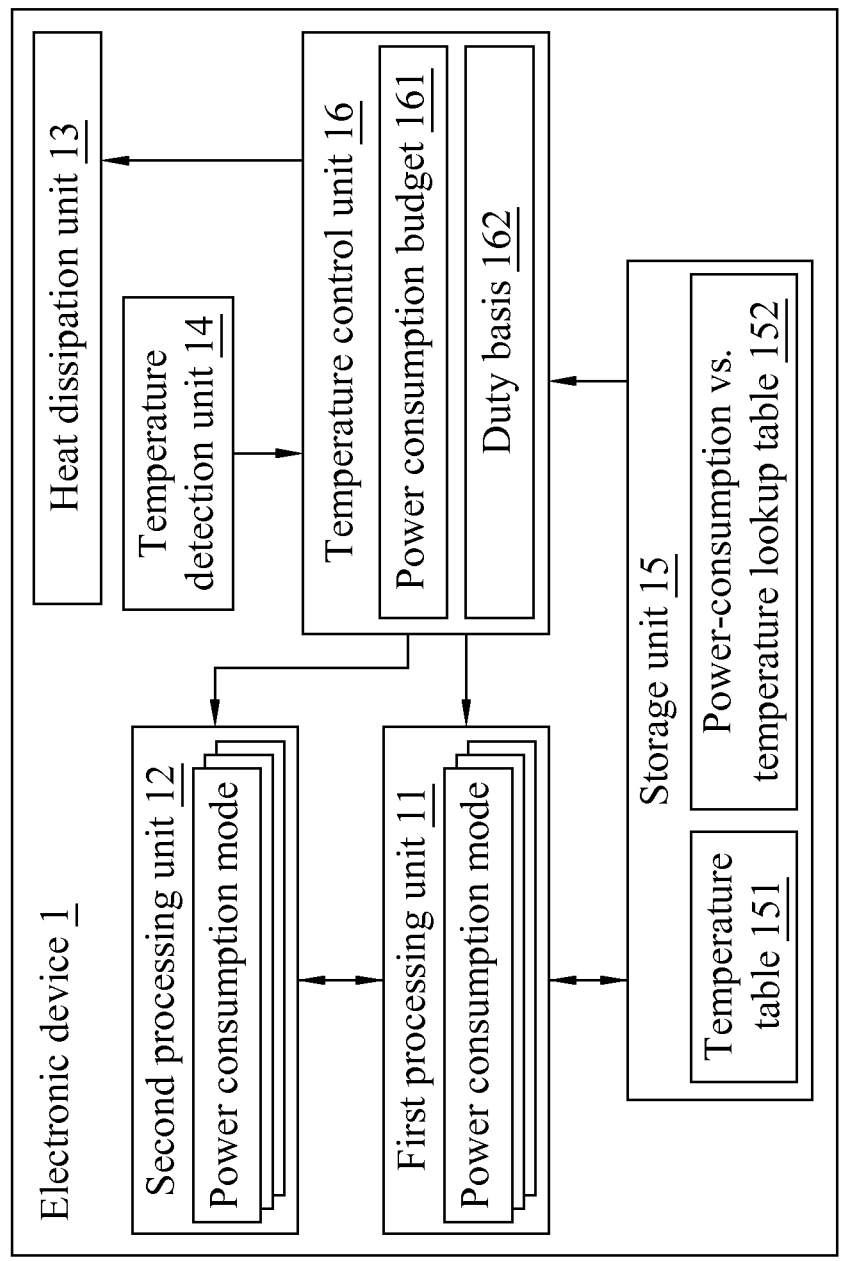
FIG. 1 is a block diagram of an electronic device according to the present invention.

Please refer to FIG. 1 that is a block diagram of an electronic device according to the present invention. As shown, the electronic device includes a first processing unit 11, a second processing unit 12, a heat dissipation unit 13, a temperature detection unit 14, a storage unit 15, and a temperature control unit 16. The first processing unit 11 and the second processing unit 12 respectively have a plurality of power-consumption modes. For example, the first processing unit 11 can be a central processing unit (CPU) chip and the second processing unit 12 can be a graphics processing unit (GPU) chip. Both the CPU chip and the GPU chip can operate at different operating frequencies and voltages, or have different operating performance and power consumption according to different input current and voltages. The power consumption is higher when the operating frequency is high, and is lower when the operating frequency is low; i.e., the input current value and voltage value are in a direct proportion with the power consumption. The temperature detection unit 14 is used to detect a temperature 141 of the electronic device 1. In practical implementation, the temperature detection unit 14 is preferably a thermistor. The heat dissipation unit 13 serves to dissipate heat produced by the electronic device 1. In practical implementation, the heat dissipation unit 13 can preferably provide different heat dissipation levels. For example, in the case the heat dissipation unit 13 is a fan, different heat dissipation levels can be effectuated by increasing or decreasing a rotary speed of the fan.

The storage unit 15, such as a memory or a hard disk, is used to store a temperature table 151 and a power-consumption vs. temperature lookup table 152. The temperature table 151 records different operating modes of the heat dissipation unit 13 corresponding to a plurality of different thermal zones; and the power-consumption vs. temperature lookup table 152 records the plurality of thermal zones and different power consumption budgets corresponding thereto. The following Table 1 is an example of the temperature table 151, and Table 2 is an example of the power-consumption vs. temperature lookup table 152. In practical implementation, in Table 1 and Table 2, a temperature difference between a first starting temperature and a first end temperature is defined as a first thermal zone, and a temperature difference between a second starting temperature and a second end temperature is defined as a second thermal zone.

TABLE 1

| Temperature | Fan Operating Mode (Rotary Speed) |
|---|---|
| $1^{st}$ End temperature | $1^{st}$ rotary speed ended |
| $1^{st}$ Starting temperature | $1^{st}$ rotary speed started |
| $2^{nd}$ End temperature | $2^{nd}$ rotary speed ended |
| $2^{nd}$ Starting temperature | $2^{nd}$ rotary speed started |
| ... | ... |
| $N^{th}$ End temperature | $N^{th}$ rotary speed ended |
| $N^{th}$ Starting temperature | $N^{th}$ rotary speed started |
| Critical point | Perform safety procedure |

TABLE 2

| Thermal Zone | Power Consumption Budget |
|---|---|
| $1^{st}$ Thermal zone | $1^{st}$ Power value (W) |
| $2^{nd}$ Thermal zone | $2^{nd}$ Power value (W) |
| ... | ... |
| $N^{th}$ Thermal zone | $N^{th}$ Power value (W) |

The temperature control unit 16 checks the power-consumption vs. temperature lookup table 152 to obtain a power consumption budget 161 based on an initial thermal zone value, and detects a duty basis 162 of the first processing unit 11 or the second processing unit 12. In practical implementation, the duty basis 162 can include the number, types or electric current consumption of applications executed by the first or the second processing unit 11, 12. For example, the larger the number of executed applications is, the higher the duty basis 162 gets; the duty basis 162 is higher when a 3D image player or an animation decoder is executed; similarly, the higher the electric current consumption is, the higher the duty basis 162 gets.

The temperature control unit 16 then dynamically regulates the power consumption mode of the first or the second processing unit 11, 12 according to the duty basis 162 and the initial power consumption budget 161. In the case the first processing unit 11 has a duty basis 162 higher than that of the second processing unit 12, the first processing unit 11 is set to a higher power consumption mode and the second processing unit 12 is set to a lower power consumption mode. For example, when it is detected that ten applications are executed by the first processing unit 11 while only two applications are executed by the second processing unit 12, the first processing unit 11 is then set at a higher operating frequency, that is, a higher power consumption mode, and the second processing unit 12 is set at a lower operating frequency, that is, a lower power consumption mode. Or, when it is detected that the first processing unit 11 is executing only a basic operating system while the second processing unit 12 is executing a 3D image player, the first processing unit 11 is then set at a lower operating frequency, i.e. a lower power consumption mode, and the second processing unit 12 is set at a higher operating frequency, i.e. a higher power consumption mode. Please note that the above-mentioned higher or lower operating frequency refers to a comparison within the same one processing unit instead of between two different processing units. In other words, it is possible the lower operating frequency of the first processing unit 11 is higher than the higher operating frequency of the second processing unit 12.

The temperature control unit 16 is able to dynamically change the power consumption budget 161 according to the temperature 141 and the power consumption vs. temperature lookup table 152. In practical implementation, after regulating the power consumption modes of the first processing unit 11 and the second processing unit 12, the temperature control unit 16 can detect a total power consumption of the electronic device 1 and determine whether the total power consumption is larger than the power consumption budget 161 or not. If yes, it means that the previous regulation of power consumption modes is not suitable and requires further regulation. In addition, after the regulation of power consumption mode, the temperature control unit 16 can further determine according to the temperature table 151 whether the temperature 141 of the electronic device 1 has reached at a temperature that necessitates a higher heat dissipation level. If yes, it means the temperature of the electronic device 1 keeps raising even the power consumption modes of the first and the second processing unit 11, 12 have been regulated. Thus, it is necessary to select a new thermal zone and to checks the power-consumption vs. temperature lookup table 152 to obtain a new power consumption budget 161, and then to re-regulate the power consumption modes of the first and the second processing unit 11, 12.

The regulation of the power consumption modes of the first and second processing units 11, 12 as well as the power consumption budget 161 is repeated until the temperature 141 of the electronic device 1 reaches at a heat dissipation level that allows the lowering of the heat dissipation unit 13.

The electronic device 1 is preferably a computer device, such as a desktop computer, a notebook computer, or a tablet computer.

Figure 2:
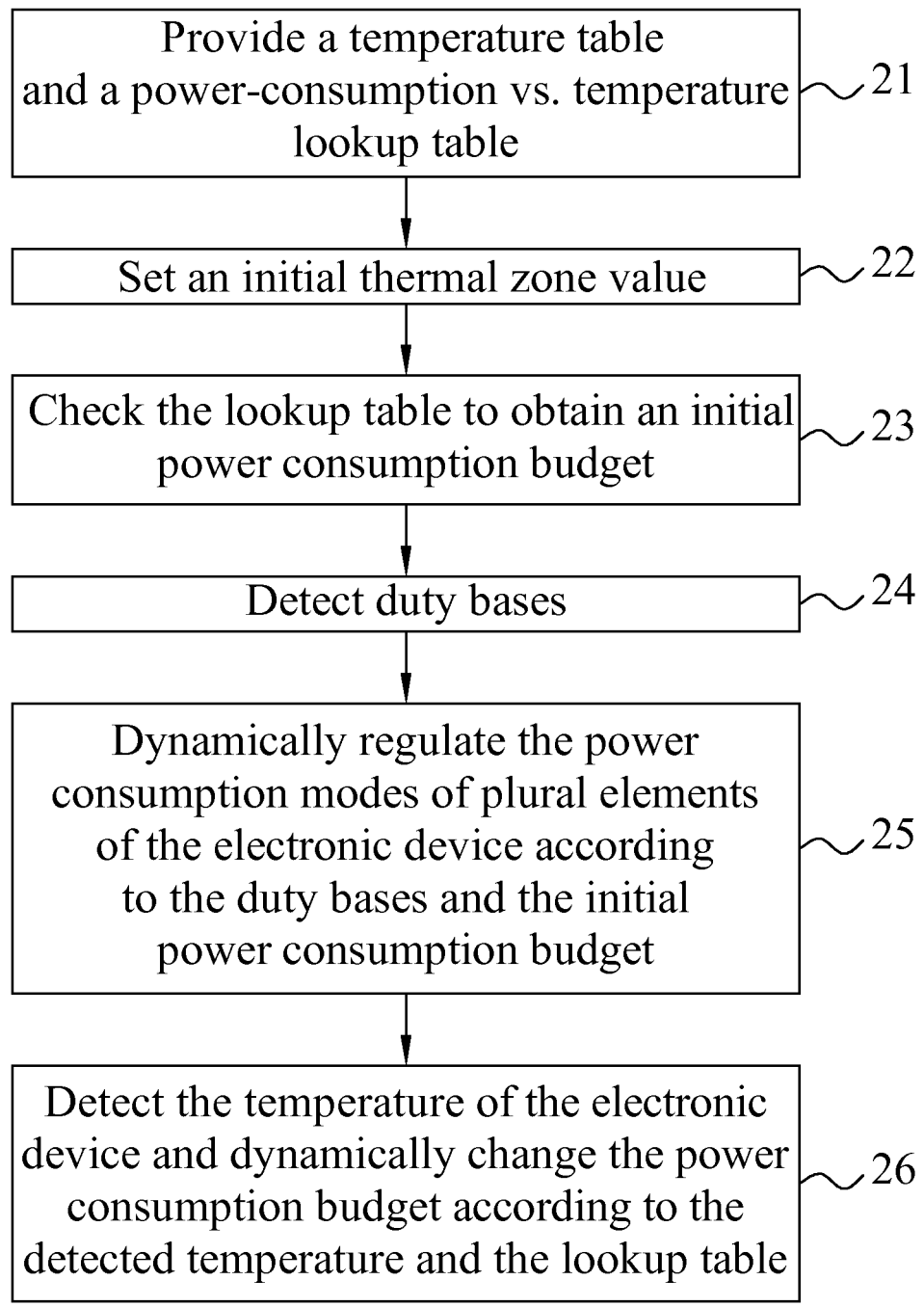
FIG. 2 is a flowchart showing the steps included in a temperature control method according to the present invention.

Please refer to FIG. 2 that is a flowchart showing the steps included in a temperature control method according to the present invention. As shown, the temperature control method is applicable to an electronic device that includes a first processing unit, a second processing unit, a heat dissipation unit, and a temperature detection unit. The first and the second processing unit respectively have a plurality of power consumption modes. The first processing unit can be, for example, a central processing unit (CPU) chip, and the second processing unit can be, for example, a graphics processing unit (GPU) chip. The power consumption mode of both the CPU chip and the GPU chip can be changed by externally controlling an operating frequency thereof. The power consumption would be lower in the case of a lower operating frequency, and would be higher in the case of a higher operating frequency. According to the temperature control method, in a step 21, a temperature table and a power-consumption vs. temperature lookup table are provided; the temperature table records different operating modes of the heat dissipation unit corresponding to a plurality of different thermal zones, and the power-consumption vs. temperature lookup table records a plurality of thermal zones and different power consumption budgets corresponding thereto; in a step 22, an initial thermal zone value is set; and in a step 23, an initial power consumption budget is obtained from the power-consumption vs. temperature lookup table based on the initial thermal zone value.

Then, in a step 24, a duty basis of the first processing unit or the second processing unit is detected. In practical implementation, the number, types or electric current consumption of applications that are executed by the first or the second processing unit can be detected and used as the duty basis. In a step 25, the power consumption mode of the first or the second processing unit is dynamically regulated according to the detected duty basis and the initial power consumption budget. And then, in a step 26, a temperature of the electronic device is detected, and the power consumption budget is dynamically changed according to the detected temperature, the temperature table, and the power-consumption vs. temperature lookup table.

Figure 3:
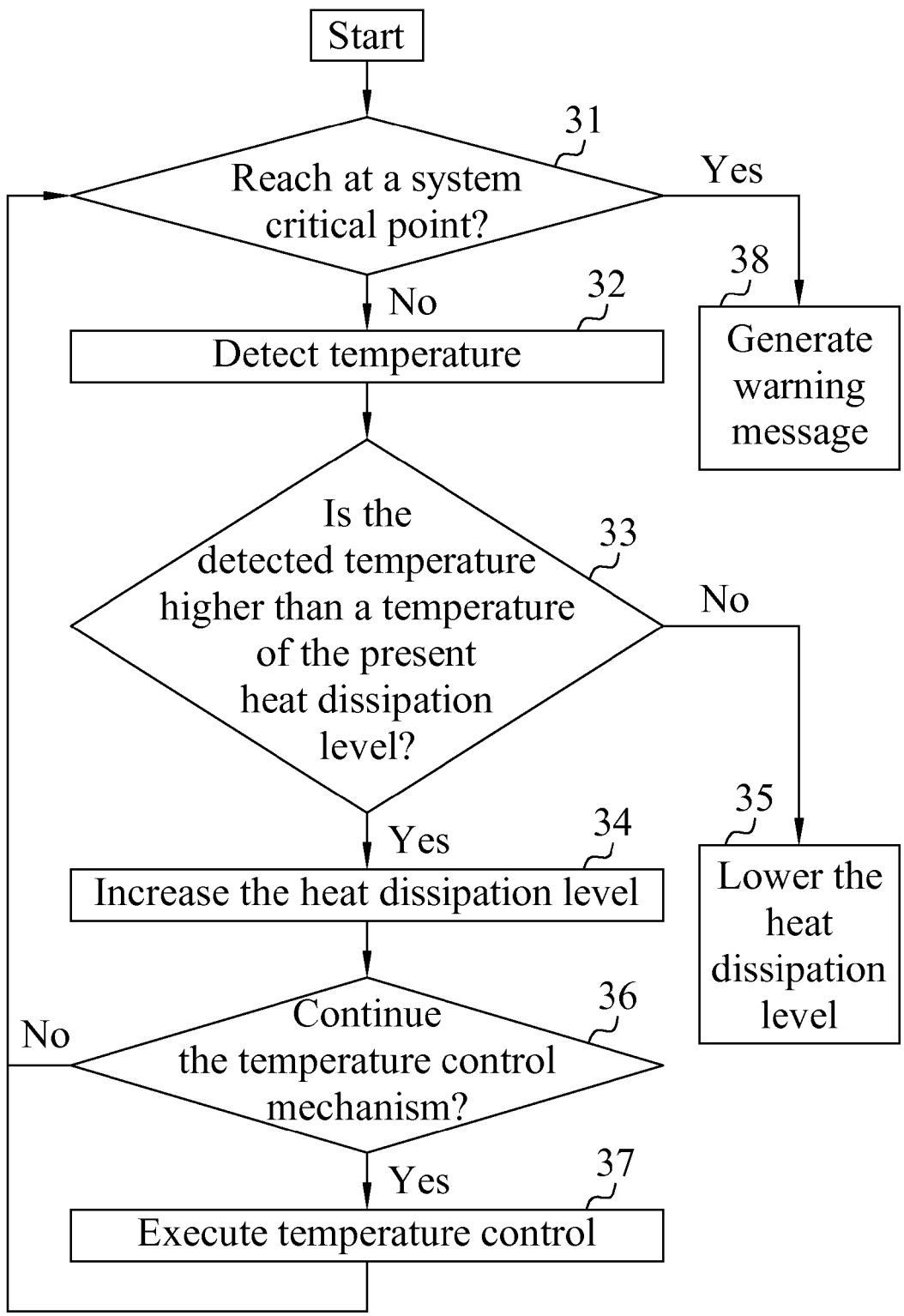
FIG. 3 is a flowchart showing the steps included in a first embodiment of the temperature control method of the present invention.

Please refer to FIG. 3 that is a flowchart showing the steps included in a first embodiment of the temperature control method according to the present invention. As shown, the temperature control method is applicable to a computer device, which includes a CPU chip, a GPU chip, a fan, and a temperature sensor. According to the temperature control method in the first embodiment, in a step 31, it is determined whether the computer device has reached at a system critical point thereof; for example, it is determined whether a present temperature of the computer device is higher than a critical temperature thereof. By critical temperature, it means a temperature beyond which the computer device is subject to a permanent damage. If the computer device has reached the critical point, a warning message is generated in a step 38, and the computer device is regulated to a lowest system performance to prevent the computer device from a permanent damage. Or, if the computer device has not reached the critical point, a temperature of the computer device is then detected in a step 32. Then, in a step 33, it is determined whether the detected temperature is higher than a temperature of the present heat dissipation level. If yes, it means a heat dissipation rate is lower than a present heat producing rate of the computer device. Therefore, in a step 34, the heat dissipation level is increased by, for example, increasing the rotary speed of the fan. Or, if not, the heat dissipation level is lowered in a step 35 by, for example, decreasing the rotary speed of the fan.

Then, in a step 36, it is determined whether a temperature control mechanism should be executed for the computer device to get an optimal balance between its temperature and performance. If it is determined not to execute the temperature control mechanism, the temperature control process goes back to the step 31; or if it is determined to execute the temperature control mechanism, the temperature control process goes to a step 37 to execute the temperature control mechanism. When the execution of the temperature control mechanism is completed, the temperature control process goes back to the step 31.

Figure 4:
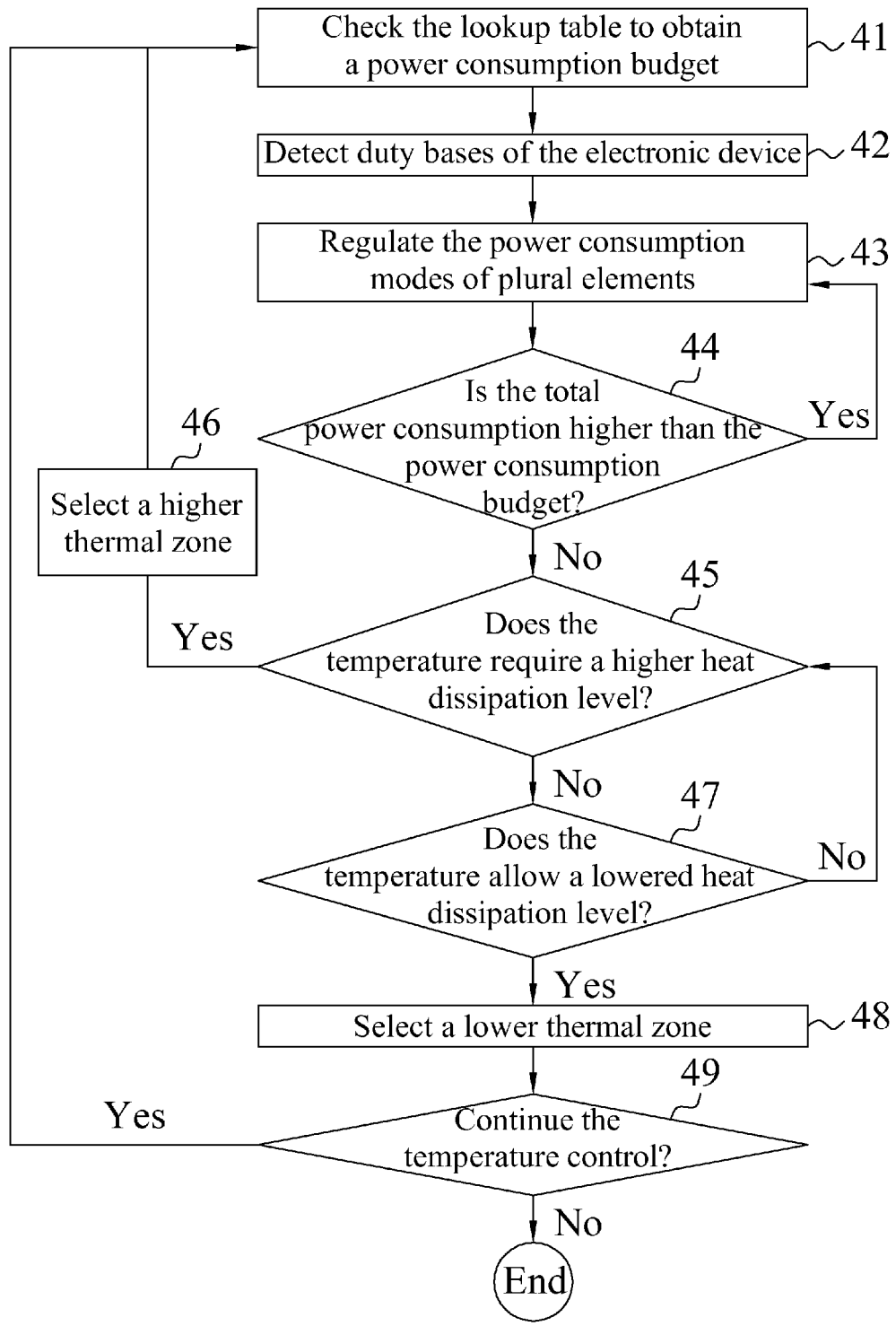
FIG. 4 is a flowchart showing the steps included in a second embodiment of the temperature control method of the present invention.

FIG. 4 is a flowchart showing the steps included in a second embodiment of the temperature control method according to the present invention. As shown, the temperature control method is applicable to an electronic device 1. According to the temperature control method in the second embodiment, in a step 41, a budget is looked up. For example, an initial thermal zone is preset, and then a power consumption budget corresponding to the initial thermal zone is obtained by checking a power-consumption vs. temperature lookup table 152, such as that shown in the above-exemplified Table 2. Then, in a step 42, the duty bases of a first processing unit 11 and a second processing unit 12 are detected. In a following step 43, power consumption modes of the first and the second processing unit 11, 12 are regulated according to the detected duty bases.

In a step 44, it is detected whether a total power consumption of the electronic device 1 is higher than the power consumption budget obtained in the step 41. If yes, it would mean that the power consumption modes have not yet been best regulated in the step 43. Therefore, the temperature control process goes back to the step 43 to regulate the power consumption modes of the first and the second processing unit 11, 12 again until the total power consumption of the electronic device 1 is lower than the power consumption budget. Or, if it is detected the electronic device 1 does not have total power consumption higher than the power consumption budget, it is then further determined in a step 45 whether a temperature of the electronic device 1 has reached at a level that requires a higher heat dissipation level. In the step 45, it is observed whether the regulation in the step 43 results in any raise in the temperature of the electronic device 1. If it is determined in the step 45 there is no need to increase the heat dissipation level, the temperature control process goes to a step 47; or if it is determined in the step 45 to increase the heat dissipation level, the temperature control process goes to a step 46, in which a higher thermal zone is selected, and then the step 41 is repeated to obtain a new power consumption budget, so as to further dynamically regulate the power consumption mode of the first or the second processing unit 11, 12.

In the step 47, it is determined whether the temperature of the electronic device 1 reaches at a level that allows a lowered heat dissipation level. If not, the step 45 is executed again after a predetermined period of delay; or if yes, it means both the performance and the temperature of the electronic device 1 have been effectively considered after the power consumption modes of the first and the second processing unit 11, 12 have been regulated. Therefore, in a step 48, a lower thermal zone is selected. Thereafter, in a step 49, it is further determined whether to continue the temperature control. For this purpose, for example, a threshold value for actuating the temperature control can be preset. In the case the current temperature is still higher than the threshold value for actuating the temperature control, it is determined to continue the temperature control and the step 41 is repeated. Otherwise, the temperature control is ended.

The present invention has been described with some preferred embodiments thereof and it is understood that many changes and modifications in the described embodiments can be carried out without departing from the scope and the spirit of the invention that is intended to be limited only by the appended claims.

What is claimed is:

1. A temperature control method applicable to an electronic device, the electronic device including a fan, a first processing unit, a second processing unit and a temperature detection unit, the first processing unit and the second processing unit respectively having a plurality of power consumption modes, the fan providing different heat dissipation levels; the temperature control method comprising the following steps of:
   providing a power-consumption vs. temperature lookup table, which records a plurality of thermal zones and a plurality of power consumption budgets corresponding to the thermal zones;
   setting an initial thermal zone value;
   checking the power-consumption vs. temperature lookup table to obtain an initial power consumption budget based on the initial thermal zone value;
   detecting a duty basis of the first or the second processing unit;
   when it is determined that a total power consumption of the electronic device is higher than the initial power consumption budget, dynamically regulating the power consumption mode of the first or the second processing unit according to the detected duty basis and the initial power consumption budget until the total power consumption of the electronic device is not higher than the initial power consumption budget, wherein when the first processing unit has a duty basis higher than that of the second processing unit, the first processing unit is set to a higher power consumption mode and the second processing unit is set to a lower power consumption mode, and when the first processing unit has a duty basis lower than that of the second processing unit, the first processing unit is set to a lower power consumption mode and the second processing unit is set to a higher power consumption mode;
   determining whether a temperature of the electronic device has reached a temperature that necessitates a higher heat dissipation level; and
   when the temperature of the electronic device has reached the temperature that necessitates a higher heat dissipation level, increasing the heat dissipation level by increasing rotary speed of the fan, selecting a higher one of the thermal zones, checking the power-consumption vs. temperature lookup table to obtain a new one of the power consumption budgets corresponding to the higher one of the thermal zones, and dynamically re-regulating the power consumption mode of the first or the second processing unit.

2. The temperature control method as claimed in claim 1, wherein the first processing unit is a central processing unit (CPU) chip.

3. The temperature control method as claimed in claim 1, wherein the second processing unit is a graphics processing unit (GPU) chip.

4. The temperature control method as claimed in claim 1, wherein the step of detecting the duty basis of the first or the second processing unit further comprising the following steps of:
   detecting the number, types or electric current consumption of applications executed by the first or the second processing unit.

5. An electronic device, comprising:
   a first processing unit having a plurality of power consumption modes;
   a second processing unit having a plurality of power consumption modes;
   a fan arranged for dissipating heat produced by the electronic device and providing different heat dissipation levels;
   a temperature detection unit arranged for detecting a temperature of the electronic device;
   a storage unit arranged for storing a power-consumption vs. temperature lookup table therein, the power-consumption vs. temperature lookup table recording a plurality of thermal zones and a plurality of power consumption budgets corresponding to the thermal zones; and
   a temperature control unit arranged for:
     checking the power-consumption vs. temperature lookup table to obtain an initial power consumption budget based on an initial thermal zone value,
     detecting a duty basis of the first or the second processing unit,
     when it is determined that a total power consumption of the electronic device is higher than the initial power consumption budget, dynamically regulating the power consumption mode of the first or the second processing unit according to the duty basis and the initial power consumption budget until the total power consumption of the electronic device is not higher than the initial power consumption budget, wherein when the first processing unit has a duty basis higher than that of the second processing unit, the first processing unit is set to a higher power consumption mode and the second processing unit is set to a lower power consumption mode, and when the first processing unit has a duty basis lower than that of the second processing unit, the first processing unit is set to a lower power consumption mode and the second processing unit is set to a higher power consumption mode;

determining whether the temperature of the electronic device has reached a temperature that necessitates a higher heat dissipation level; and when the temperature of the electronic device has reached the temperature that necessitates a higher heat dissipation level, increasing the heat dissipation level by increasing rotary speed of the fan, selecting a higher one of the thermal zones, checking the power-consumption vs. temperature lookup table to obtain a new one of the power consumption budgets corresponding to the higher one of the thermal zones, and dynamically re-regulating the power consumption mode of the first or the second processing unit.

6. The electronic device as claimed in claim 5, wherein the first processing unit is a central processing unit (CPU) chip.

7. The electronic device as claimed in claim 5, wherein the second processing unit is a graphics processing unit (GPU) chip.

8. The electronic device as claimed in claim 5, wherein the duty basis of the first or the second processing unit includes the number, types, or electric current consumption of applications executed by the first or the second processing unit.

\* \* \* \* \*